United States Patent [19]

Swanson et al.

[11] 4,086,718

[45] May 2, 1978

[54] TELESCOPING DEVICE FOR RETRIEVING FISHING LURES

[76] Inventors: Robert L. Swanson, 619 Kramer Ave.; William J. Blake, 173 E. North Ave., both of Lombard, Ill. 60148

[21] Appl. No.: 739,829

[22] Filed: Nov. 8, 1976

[51] Int. Cl.² ............................................. A01K 97/00
[52] U.S. Cl. .................................................... 43/17.2
[58] Field of Search ..................... 43/17.2, 6, 23, 18 R; 294/19 R, 19 A, 20; 403/298, 406, 407, 359

[56] References Cited

U.S. PATENT DOCUMENTS

| | | | |
|---|---|---|---|
| 2,344,838 | 3/1944 | Van Sickle | 43/17.2 |
| 3,693,280 | 9/1972 | Calhoun | 43/17.2 |
| 3,811,215 | 5/1974 | Fleischer | 43/18 R |
| 3,820,801 | 6/1974 | Lindler | 43/23 |

*Primary Examiner*—Warner H. Camp
*Attorney, Agent, or Firm*—Merriam, Marshall & Bicknell

[57] ABSTRACT

A telescoping, pole-type lure retriever has a snare portion that wraps around a fishing line and is guided thereon for removing a fishing lure that is snagged on an underwater obstruction or weeds. An elongated pole has a number of telescoping sections that may be extended to a convenient length to disengage the lure. Each telescoping section may be locked in position by turning a locking nut that compresses a locking ring in a cammed fashion to grip a smaller diameter pole section. The snake portion has a knurled shank seated in locking engagement with a sleeve member and with the sleeve fitted in the end of one pole section.

4 Claims, 4 Drawing Figures

U.S. Patent  May 2, 1978  4,086,718
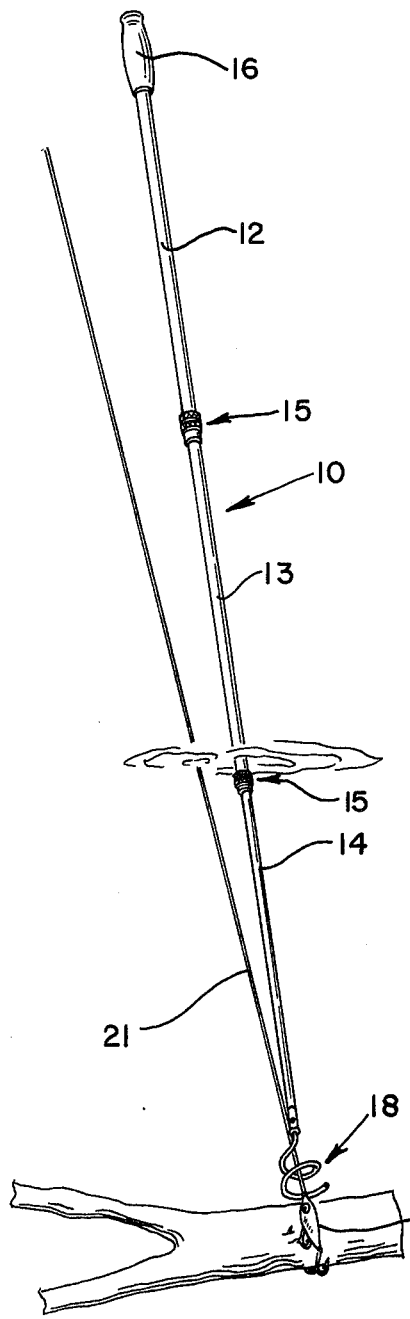
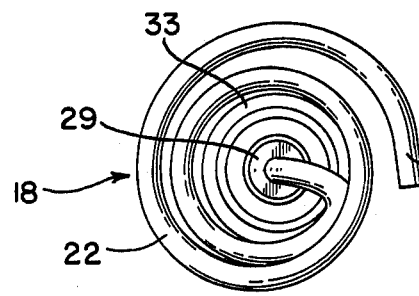
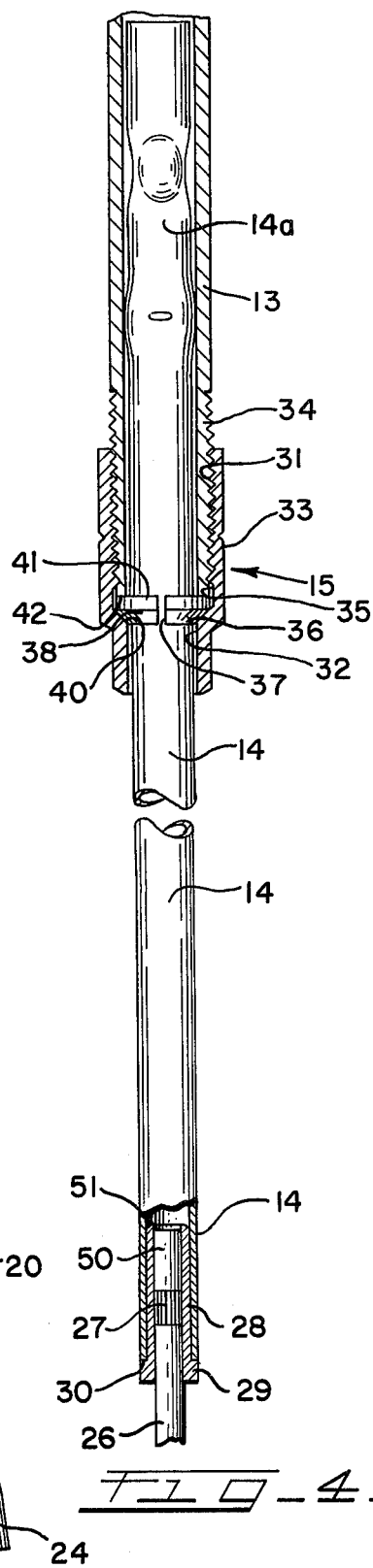
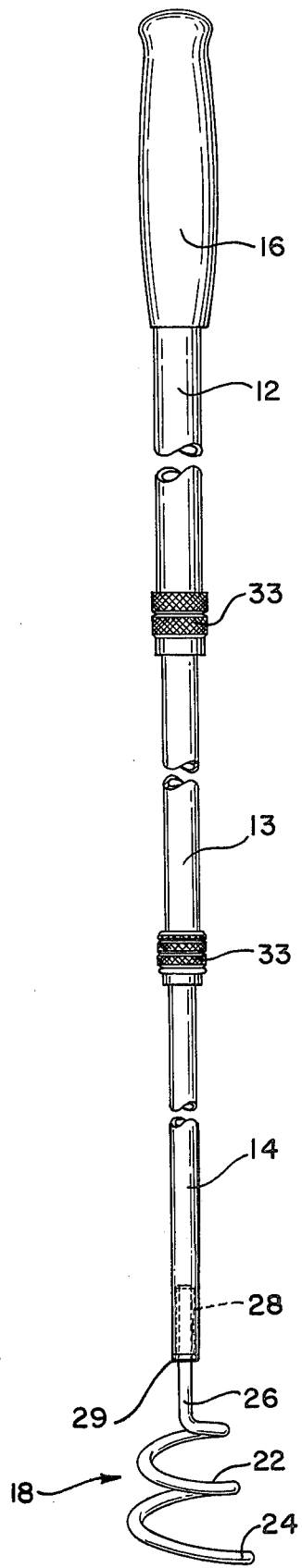

TELESCOPING DEVICE FOR RETRIEVING FISHING LURES

BACKGROUND OF THE INVENTION (1) Field of the Invention

This invention pertains to lure retrievers and in particular to a pole-type lure retriever that may be extended from a shortened or collapsed condition to a variable length for use in freeing fishing lures snagged on underwater obstructions.

(2) Description of the Prior Art

One type of earlier lure retriever employed a weighted snag member that may be lowered down a fishing line in a trolley fashion until engagement with the lure is achieved. An example of this type of retriever is shown in the Koester U.S. Pat. No. 2,739,404. Other types of lure retrievers that have been attached to fishing poles and used to engage lures that are snagged underwater are represented by the Van Sickle U.S. Pat. No. 2,344,838. Both types have not met with widespread acceptance by fishermen because the trolley-type retriever does not ensure positive engagement with a snagged lure, and any chance of securely engaging a lure to pull it free from an obstruction is speculative at best. The other type of lure retriever, one that may be attached to a fishing pole, has not received widespread acceptance because of the time and inconvenience involved in attaching the lure retriever to different diameter fishing pole ends and the attendant problem of insuring that the retriever remains attached to the pole when in use. If the lure engaging device is firmly attached to a full length fishing pole or rod it is cumbersome to store and transport such a lengthy member.

SUMMARY

This invention pertains to a portable, extendable, telescoping pole device used by fishermen for freeing fishing lures from a snagged engagement with underwater obstructions such as submerged logs, rocks, weeds and the like. Twist lock members allow telescoping pole sections to be securely interlocked to form a rigid unit.

In use, the snare is fitted about the snagged fishing line, and the telescoped tubular pole sections are extended to a desired length. The telescoped sections are then locked securely in position by tightening the appropriate twist lock members. Each twist lock member has a knurled lock nut threaded onto a pole section. A slotted locking ring cooperates with a suitably cammed internal portion of the lock nut whereby tightening movement of the lock nut compresses the slotted locking ring radially inwardly into gripping engagement with the associated telescoping tubular pole section.

These and other objects and advantages of the invention will become apparent to those skilled in the art with reference to the drawings, specification and claims.

BRIEF DESCRIPTION OF THE DRAWING

FIG. 1 is a perspective of the telescoping lure retriever fitted about a fishing line and about to engage a snagged lure for removal from an underwater obstruction;

FIG. 2 is a fragmentary side view of the telescoping lure retriever;

FIG. 3 is an enlarged end view showing the snare; and,

FIG. 4 is an enlarged fragmentary sectional view showing certain particulars of the lure retriever.

DETAILED DESCRIPTION

Referring now to the drawings and in particular to FIG. 1, there is shown a telescoping pole unit 10 made from a plurality of telescoping tubular members or sections including a tubular handle member 12, an intermediate tubular member 13 and a tubular end member 14. A pair of twist lock members 15, 15 interconnect telescoping tubular members 12, 13 and 14 to securely hold each tubular member in position so that pole unit 10 may function as a unitary assembly. A plastic hand grip 16 may be attached to the end of tubular handle member 12 to improve the gripping and handling characteristics of unit 10.

Referring to FIG. 4, telescoping end member 14 has a crimped or deformed internal end portion 14a received within intermediate member 13 which also has such a deformed end portion, not shown. A deformed end portion, in effect, increases the cross-sectional dimension of the tube and helps prevent the telescoping member from becoming dismantled.

Located at the extreme end of pole unit 10 opposite hand grip 16 is a snare 18 used to contact a lure 20 (FIG. 1). The snare has a spiral form including an outer coil 22 with an end portion 24 that is inclined outwardly and away from the main body of the snare in such a manner as to permit the snare to be easily engaged and twisted about a fishing line 21.

As shown in FIG. 2, snare 18 includes a shank 26 knurled at 27 for a force fit into a tubular adapter 28 held in place within end member 14 by a force-fit connection or by a fastener to form a secure connection. Adapter 28 has an end flange 29 for engaging a terminal end 30 of member 14.

As shown in FIG. 4, each twist lock member 15 comprises a lock nut 33 having an internally threaded part 31 for engaging an externally threaded outer end portion 34 of an associated tubular member. The lock nut may have a knurled exterior surface for improved gripping. Lock nut 33 also includes a first unthreaded cylindrical portion or recess 35 integral with internally threaded part 31, and from which extends a downwardly and inwardly inclined inner cam surface 40 terminating at a second unthreaded cylindrical portion 32, narrower than first unthreaded cylindrical portion 35. Located within lock nut 33, at recess 35, is a locking ring 36 having a slot 37 and comprising a cylindrical portion 41 from which extends a downwardly and inwardly inclined outer cam surface 38. Locking ring 36 is composed of a resilient material and cooperates with lock nut 33 to tighten the locking ring about a pole member as lock nut 33 is turned and tightened.

More specifically, upon twisting lock nut 33 in a clockwise direction, as viewed from the snare end of the pole unit 10, inner cam surface 40 on nut 33 engages outer cam surface 38 on ring 36 to move ring 36 as nut 33 moves axially upwardly relative to member 13. Initially, nut 33 and locking ring 36 both move axially upward relative to externally threaded portion 34 of tubular member 13 until cylindrical portion 41 on ring 36 abuts a terminal end 42 of member 13. Thereafter, as lock nut 33 moves axially in response to further tightening, its inner cam surface 40 will press against associated outer cam surface 38 on locking ring 36 to impart a radial inward contraction of locking ring 36 which takes up the spacing provided by slot 37. As this radial movement occurs, locking ring 36 will gradually compress around and come into gripping contact with the internal telescoping tube member 14, thus producing a locking engagement between outer tube member 13 and inner telescoping tube member 14.

To telescope the members into a shortened unit for storage or transport, each lock nut 33 is unscrewed or loosened to separate cam surfaces 38 and 40 whereby locking ring 36 will spring radially away from encircled pole member 14 to release the frictional engagement that had locked the two members 13, 14 together. When such locking engagement is eliminated, the pole members may be easily telescoped together.

Because the lure retriever provided herein is made from telescoping aluminum sections it may be easily stored in a boat or alongside a fisherman when not in use and easily transported in the trunk or passenger compartment of an automobile or camper. When a lure is caught on an underwater obstruction, the lure retriever pole sections may be easily expanded to an appropriate length and then securely locked in the extended position during use. Each twist lock 15 may be operated to produce a pole length sufficient to reach an underwater lure. In one embodiment, as telescoped for storage, the lure retriever may be 3–5 feet in length while, as extended, it is about 10 feet in length. More or fewer than three telescoping sections may be utilized as required from a convenience, manufacturing or cost standpoint.

Referring again to snare 18 and its attachment to end member 14, the snare's shank 26 has elongated knurls rolled integrally onto the periphery of the shank at 27 in the direction of the shank's axis. Shank 26 has an outer diameter less than the inner diameter of tubular adaptor 28, but the external cross-sectional dimension of shank 26 at elongated knurling 27 is greater than the inner diameter of adaptor 28 to effect the force fit of shank 26 within adaptor 28. Shank 26 has an un-knurled end portion 50 which precedes the knurling into adaptor 28 and which is located further within the adaptor than the knurling. In a typical embodiment, shank 26 has an outer diameter of 0.187 in. and a cross-sectional dimension at the knurling of 0.195 in. while adaptor 28 has an inner diameter of 0.189 in.

Adaptor 28 has an outer diameter (e.g., 0.312 in.) slightly greater than the inner diameter (e.g., 0.311 in.) of tubular end member 14 so that adaptor 28 expands tubular end member 14, when the adaptor is force fit into the end member, thereby to lock the adaptor inside the end member. Adaptor 28 includes a tapered inner end portion 51, opposite end flange 29, having an outer diameter smaller than the inner diameter of tubular end member 14 to permit an initial insertion of wider adaptor 28 into narrower end member 14 when the former is force fit into the latter. As an alternative, adaptor 28 may be fixed within end member 14 using external knurling similar to that used on shank 26 at 27 to fix the shank within the adaptor.

The foregoing description and drawings merely explain and illustrate the invention and the invention is not limited thereto, except insofar as the appended claims are so limited, as those who are skilled in the art who have the disclosure before them will be able to make modifications and variations therein without departing from the scope of the invention.

What is claimed is:

1. A lure retriever comprising:
a pole unit;
a lure-engaging snare;
a shank on said snare;
a tubular adaptor having an inner diameter greater than the outer diameter of said shank;
means on the periphery of said shank, and integral therewith, for effecting a force fit of said shank within said adaptor;
said pole unit comprising a tube having a terminal end;
and means on the outer periphery of said adaptor, and integral therewith, for locking said adaptor inside said tube adjacent said terminal end thereof.

2. The lure retriever of claim 1 wherein:
said means on the periphery of said shank comprises elongated knurls extending in the direction of the axis of said shank;
said knurls having a cross-sectional dimension greater than the inner diameter of said tubular adaptor;
and an un-knurled end portion on said shank located further within said adaptor than said knurls.

3. The lure retriever of claim 1 wherein:
said means on the outer periphery of said adaptor comprises an outer diameter greater than the inner diameter of said tube;
said adaptor comprising a tapered inner end portion having an outer diameter smaller than the inner diameter of said tube;
said adaptor further comprising means, at an end of the adaptor opposite said inner end portion for engaging the terminal end of said tube.

4. A lure retriever as recited in claim 1 wherein:
said pole unit comrises a plurality of interconnected telescoping members;
one of said telescoping members having an end portion receivable within the other of said telescoping members;
and crimped means on said end portion for preventing dismantling of said members.

* * * * *